UNITED STATES PATENT OFFICE.

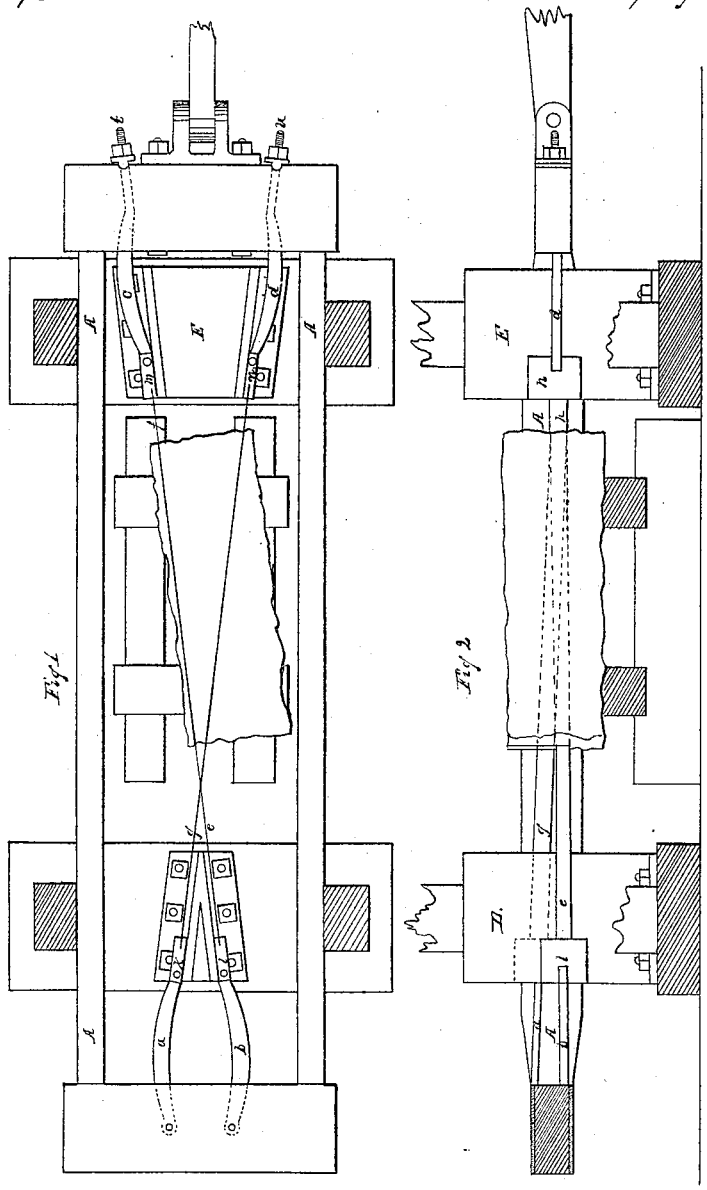

JNO. COCHRANE, OF BALTIMORE, MARYLAND.

MACHINE FOR SAWING MARBLE.

Specification of Letters Patent No. 13,540, dated September 11, 1855.

*To all whom it may concern:*

Be it known that I, JOHN COCHRANE, of the city of Baltimore and State of Maryland, have invented a new and useful Improvement in Machinery for Sawing Marble or Stone, by means of which improvement two inclined sides of a tapering block or pyramid can be cut at one operation; and I hereby declare that the following is a full and exact description thereof, reference being had to the accompanying drawings, and to the letters of reference marked thereon, in which—

Figure 1, is a top view or plan, and Fig. 2 a side elevation.

The same letters are used to designate the same parts in both figures.

In construction, the saw gate A A A A does not vary materially from those commonly used for gangs, except that it has to be made long enough in the clear of the cross-heads or end framing to admit the accommodation links a, b, c, d, in addition to the length of the saw blades. The saw blades e f and g h, are trained in a diagonal or angular position within the gate forming with each other an angle equal to the required taper of the proposed pyramid or block and are retained in that position by the guides D and E. Upon these guides the sliders k, l, m, n, are made to work. These are attached to the cross-heads of the saw gate by the accommodation links a, b, c, d, all the attachments of which, with the sliders and saw gate, should be so made as to admit of motion. Clevises are formed in the sliders for the reception of the saw blades. And in which they are secured by means of pins, passing through the blades and the jaws of the clevises. One pair of the accommodation links is furnished with screws and nuts, as shown at t and u Fig. 1, for the purpose of straining the jaws and warping. or twisting of the saws is effectually prevented by the bearing of the sliders against the guides. When the sliders are made to rub on the guides the bearing surfaces of both should be made smooth, and both should be of iron or some other hard material; but instead of rubbing on the guides the sliders may be constructed with friction rollers or wheels, which will answer the same purpose.

In all cases the guides must be sustained in their proper position independently of the saw gate, which is hung and operated in the usual manner, or in any convenient way which will answer the purpose.

Having thus described the construction and operation of my improved sawing machine, whereby two inclined kerfs or two bevel sides of a taper block of stone or marble can be cut at one operation, what I claim therein as my invention and desire to secure by Letters Patent is—

The hanging of two saws in one gate at any required angle with each other, in combination with the angular guides D and E, the sliders k, l and m, n, and the accommodation links a, b and c, d; or their equivalents, for the purpose of sawing two inclined or tapering sides of a block of marble or stone, at one operation, the whole being constructed and operated substantially in the manner set forth.

JOHN COCHRANE.

Witnesses:
JAMES COCHRANE,
R. D. COCHRANE.